(12) United States Patent
Kuramkote et al.

(10) Patent No.: US 11,416,346 B2
(45) Date of Patent: Aug. 16, 2022

(54) METHODS FOR SECURELY FACILITATING DATA PROTECTION WORKFLOWS AND DEVICES THEREOF

(71) Applicant: NetApp, Inc., Sunnyvale, CA (US)

(72) Inventors: Ravindra Kuramkote, San Jose, CA (US); Abhishek Naidu, San Jose, CA (US); Paul Ngan, Redwood City, CA (US); Paul Yuedong Mu, San Jose, CA (US); Atul Pandit, Los Gatos, CA (US)

(73) Assignee: NETAPP, INC., Sunnyvale, CA (US)

( * ) Notice: Subject to any disclaimer, the term of this patent is extended or adjusted under 35 U.S.C. 154(b) by 354 days.

(21) Appl. No.: 16/659,227

(22) Filed: Oct. 21, 2019

(65) Prior Publication Data
US 2020/0128024 A1   Apr. 23, 2020

Related U.S. Application Data

(60) Provisional application No. 62/748,121, filed on Oct. 19, 2018.

(51) Int. Cl.
*G06F 16/20* (2019.01)
*G06F 11/14* (2006.01)
(Continued)

(52) U.S. Cl.
CPC ...... *G06F 11/1464* (2013.01); *G06F 11/1451* (2013.01); *G06F 16/2452* (2019.01);
(Continued)

(58) Field of Classification Search
CPC ........... G06F 16/2452; G06F 16/24534; G06F 11/1451; G06F 11/1464; H04L 63/0236;
(Continued)

(56) References Cited

U.S. PATENT DOCUMENTS 9,558,204 B2 * 1/2017 Leong ................... G06F 16/113
2004/0205048 A1 * 10/2004 Pizzo .................. G06F 16/2358
(Continued)

*Primary Examiner* — Tarek Chbouki
(74) *Attorney, Agent, or Firm* — Troutman Pepper Hamilton Sanders LLP (Rochester)

(57) ABSTRACT

Methods, non-transitory machine readable media, and computing devices that more securely facilitate data protection workflows are disclosed. With this technology, identification information for primary inbound and outbound queues is extracted from a registration token received from an administrator device. A registration request is inserted into the primary outbound queue using the identification information and one or more communication networks that are external to a data center. The primary inbound queue is polled using the identification information and the communication networks to retrieve messages from a backup service computing device that instantiated the queues and generated the registration token. Accordingly, nodes in a data center can communicate more securely with a cloud backup service via queues and without exposing any HTTP ports to the backup service. Advantageously, the backup service can learn the topology of a storage cluster and manage data protection workflows via communications with one of the constituent nodes.

20 Claims, 5 Drawing Sheets

(51) Int. Cl.
*H04L 41/0816* (2022.01)
*H04L 49/00* (2022.01)
*H04L 9/40* (2022.01)
*H04L 67/1097* (2022.01)
*G06F 16/2452* (2019.01)
*G06F 16/2453* (2019.01)

(52) U.S. Cl.
CPC .... *G06F 16/24534* (2019.01); *H04L 41/0816* (2013.01); *H04L 49/30* (2013.01); *H04L 63/0236* (2013.01); *H04L 63/0807* (2013.01); *H04L 63/10* (2013.01); *H04L 63/126* (2013.01); *H04L 63/166* (2013.01); *H04L 67/1097* (2013.01); *G06F 2201/815* (2013.01); *G06F 2201/84* (2013.01); *H04L 63/20* (2013.01)

(58) Field of Classification Search
CPC ... H04L 63/0807; H04L 63/10; H04L 63/126; H04L 63/166; H04L 49/30; H04L 41/0816; H04L 67/1097
See application file for complete search history.

(56) References Cited

U.S. PATENT DOCUMENTS

| | | | |
|---|---|---|---|
| 2010/0223396 A1* | 9/2010 | Bhootada | H04L 67/125 709/234 |
| 2011/0126003 A1* | 5/2011 | Engert | H04L 63/0823 713/156 |
| 2016/0132310 A1 | 5/2016 | Koushik et al. | |
| 2016/0191672 A1* | 6/2016 | Perlman | H04L 5/0001 370/474 |
| 2018/0341666 A1* | 11/2018 | Lee | G06F 16/1873 |
| 2019/0124141 A1 | 4/2019 | Waltz et al. | |
| 2019/0370128 A1 | 12/2019 | Sadavarte et al. | |

* cited by examiner

METHODS FOR SECURELY FACILITATING DATA PROTECTION WORKFLOWS AND DEVICES THEREOF

This application claims the benefit of U.S. Provisional Patent Application Ser. No. 62/748,121, filed on Oct. 19, 2018, which is hereby incorporated by reference in its entirety.

FIELD

This technology generally relates to data storage networks and, more particularly, to methods and devices for securely facilitating data protection workflows using cloud resources in distributed data storage networks.

BACKGROUND

Data storage networks are increasingly utilized to store large amounts of data in a durable manner. Many data storage networks are hybrid cloud networks that utilize cloud storage devices to store backup copies of data or volumes that can be used to facilitate data protection workflows, such as versioning and restore following a failure event. In many deployments, on-premises storage nodes manage data in the form of files or objects according to filesystems maintained across volumes on storage devices within a data center.

Backup service applications in a cloud network are then deployed to communicate with the on-premises storage nodes to ingest and catalog backup copies of data on the cloud storage devices, and facilitate the data protection workflows. The cloud backup service applications generally communicate with the storage nodes in the data center across communication networks, which may be wide area and/or public cloud networks. Exposing HyperText Transfer (HTTP) ports of the storage nodes, for example, to such communication networks, cloud devices, and associated network traffic, results in increased security risk.

Moreover, it is often challenging to manage data protection workflows with the backup service applications deployed in a cloud network because storage nodes are generally deployed in large numbers across many storage clusters having complex topologies. Managing data protection workflows currently requires registering each storage node with the backup service application in the cloud network, which is a tedious and error prone process and may require upgrading software hosted by at least a subset of the storage nodes.

DETAILED DESCRIPTION

Figure 1:
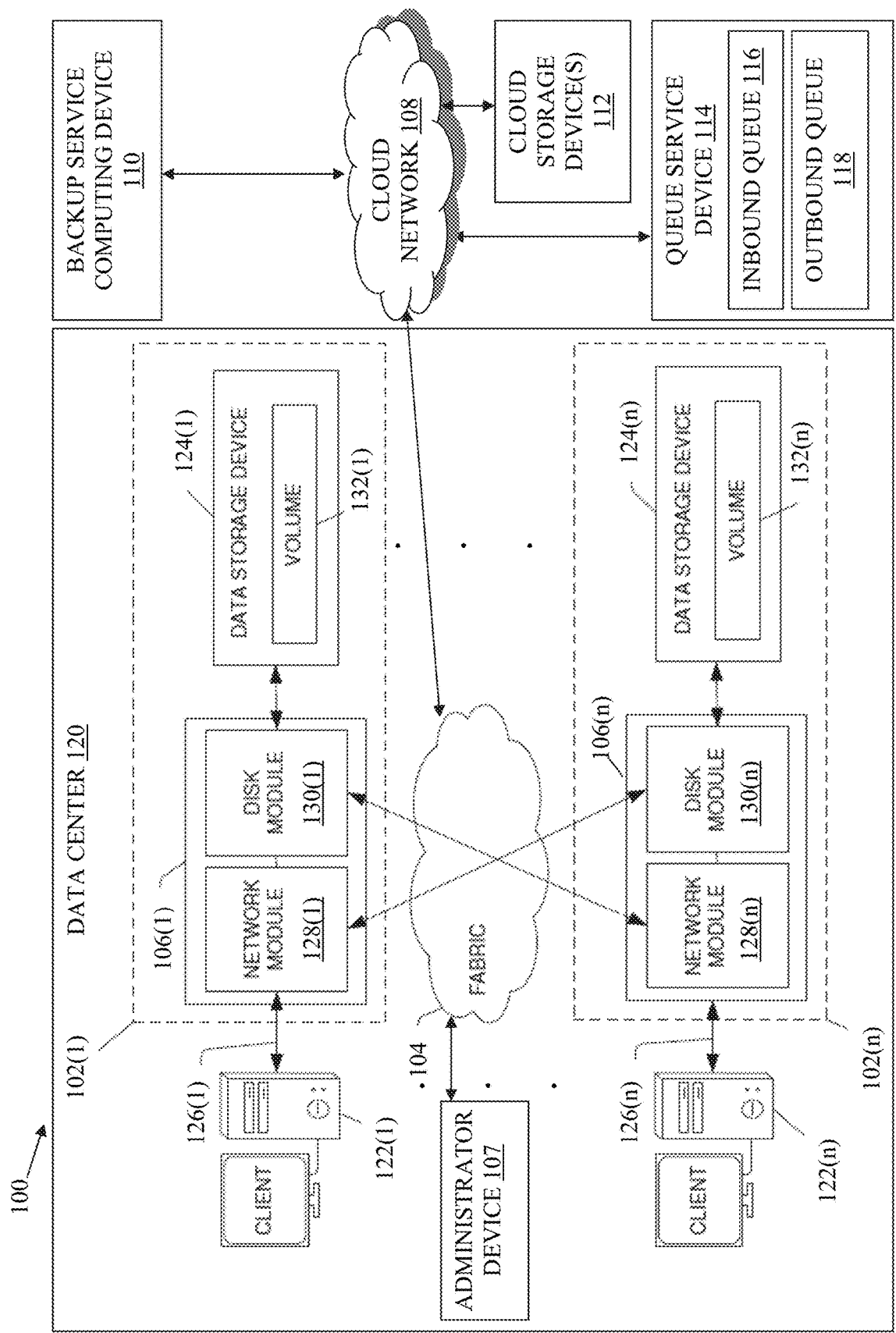
FIG. 1 is a block diagram of a network environment with exemplary node computing devices and a backup service computing device in a hybrid data storage network.

A clustered, cloud hybrid data storage network environment 100 that may implement one or more aspects of the technology described and illustrated herein is shown in FIG. 1. The network environment 100 includes data storage apparatuses 102(1)-102(n) that are coupled over a cluster or data fabric 104 that facilitates communication between the data storage apparatuses 102(1)-102(n) (and one or more modules, components, etc. therein, such as, node computing devices 106(1)-106(n), for example). The data storage apparatuses 102(1)-102(n) also are coupled to an administrator device 107 via the data fabric 104. Further, the data storage apparatuses 102(1)-102(n) are coupled via the data fabric 104 to a cloud network 108 that includes communication network(s) over which a backup service computing device 110 communicates with cloud storage device(s) 112 and a queue service device 114 hosting primary inbound and outbound queues 116 and 118, respectively, having associated endpoints or addresses.

In particular, the node computing devices 106(1)-106(n) advantageously communicate indirectly with the backup service computing device 110 via the primary inbound and outbound queues 116 and 118, respectively, to prevent exposure to the backup service computing device 110 and other network traffic exchanged over the cloud network 108, as described and illustrated in detail herein. Any number of other elements or components can also be included in the clustered network environment 100 in other examples. This technology provides a number of advantages including methods, non-transitory computer readable media, and computing devices that limit the exposure of the node computing devices 106(1)-106(n) to security risks and leverage a cloud proxy of one of the node computing devices 106(1)-106(n) to communicate with storage cluster peers to more securely and efficiently facilitate data protection workflows.

In this example, node computing devices 106(1)-106(n) are located in a data center 120 and can be primary or local storage controllers or secondary or remote storage controllers that provide client devices 122(1)-122(n) with access to data stored within data storage devices 124(1)-124(n) and cloud storage device(s) 112. The data storage apparatuses 102(1)-102(n) and/or node computing devices 106(1)-106(n) of the examples described and illustrated herein are not limited to any particular geographic areas and can be clustered locally and/or remotely, or not clustered in other examples. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single on-site rack in the data center 120).

In the illustrated example, one or more of the client devices 122(1)-122(n), which may be, for example, personal computers (PCs), computing devices used for storage (e.g., storage servers), or other computers or peripheral devices, are coupled to the respective data storage apparatuses 102(1)-102(n) by network connections 126(1)-126(n). Network connections 126(1)-126(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 122(1)-122(n) may be general-purpose computers running applications and may interact with the data storage apparatuses 102(1)-102(n) using a client/server model for exchange of information. That is, the client devices 122(1)-122(n) may request data from the data storage apparatuses 102(1)-102(n) (e.g., data on one of the data storage devices 124(1)-124(n) managed by a network storage controller configured to process I/O commands issued by the client devices 122(1)-122(n)), and the data storage apparatuses 102(1)-102(n) may return results of the request to the client devices 108(1)-108(n) via the network connections 126(1)-126(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within cloud storage device(s) 112), etc., for example. Such node computing devices 106(1)-106(n) can be attached to the data fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 124(1)-124(n) in the event a disaster occurs at a disaster storage site (e.g., the node computing device 106(1) provides client device 122(n) with switchover data access to storage devices 124(1) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 128(1)-128(n) and disk modules 130(1)-130(n). Network modules 128(1)-128(n) can be configured to allow the node computing devices 106(1)-106(n) (e.g., network storage controllers) to connect with client devices 122(1)-122(n) over the storage network connections 126(1)-126(n), for example, allowing the client devices 122(1)-122(n) to access data stored in the clustered network environment 100.

Further, the network modules 128(1)-128(n) can provide connections with one or more other components through the cluster fabric 104. For example, the network module 128(1) of node computing device 106(1) can access the data storage device 124(n) by sending a request via the cluster fabric 104 through the disk module 130(n) of node computing device 106(n). The cluster fabric 104 can include one or more local and/or wide area computing networks (i.e., cloud networks) embodied as Infiniband, Fibre Channel (FC), or Ethernet networks, for example, although other types of networks supporting other protocols can also be used.

Disk modules 130(1)-130(n) can be configured to connect data storage devices 124(1)-124(n), such as disks or arrays of disks, SSDs, flash memory, or some other form of data storage, to the node computing devices 106(1)-106(n). Often, disk modules 130(1)-130(n) communicate with the data storage devices 124(1)-124(n) according to the SAN protocol, such as SCSI or FCP, for example, although other protocols can also be used. Thus, as seen from an operating system on node computing devices 106(1)-106(n), the data storage devices 124(1)-124(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 128(1)-128(n) and disk modules 130(1)-130(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 122(1)-122(n) can be networked with the node computing devices 106(1)-106(n) in the cluster, over the storage connections 126(1)-126(n). As an example, respective client devices 122(1)-122(n) that are networked to a cluster may request services (e.g., exchanging of information in the form of data packets) of node computing devices 106(1)-106(n) in the cluster, and the node computing devices 106(1)-106(n) can return results of the requested services to the client devices 122(1)-122(n). In one example, the client devices 122(1)-122(n) can exchange information with the network modules 128(1)-128(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 124(1)-124(n), for example. One or more of the data storage devices 124(1)-124(n) can include mass storage devices, such as disks of a disk array. The disks may comprise any type of mass storage devices, including but not limited to magnetic disk drives, flash memory, HDDs, SSDs, and any other similar media adapted to store information, including, for example, data and/or parity information.

The aggregates include volumes 132(1)-132(n) in this example, although any number of volumes can be included in the aggregates. The volumes 132(1)-132(n) are virtual data stores or storage objects that define an arrangement of storage and one or more filesystems within the clustered network environment 100. Volumes 132(1)-132(n) can span a portion of a disk or other storage device, a collection of disks, or portions of disks, for example, and typically define an overall logical arrangement of data storage. In one example, volumes 132(1)-132(n) can include stored user data as one or more files, blocks, or objects that reside in a hierarchical directory structure within the volumes 132(1)-132(n).

Volumes 132(1)-132(n) are typically configured in formats that may be associated with particular storage systems, and respective volume formats typically comprise features that provide functionality to the volumes 132(1)-132(n), such as providing the ability for volumes 132(1)-132(n) to form clusters, among other functionality. Optionally, one or more of the volumes 132(1)-132(n) can be in composite aggregates and can extend between one or more of the data storage devices 124(1)-124(n) and one or more of the cloud storage device(s) 112 to provide tiered storage, for example, and other arrangements can also be used in other examples.

In one example, to facilitate access to data stored on the disks or other structures of the data storage devices 124(1)-124(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 124(1)-124(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 124(1)-124(n) can have one or more physical ports, wherein each physical port can be assigned a target address (e.g., SCSI target address). To represent respective volumes, a target address on the data storage devices 124(1)-124(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
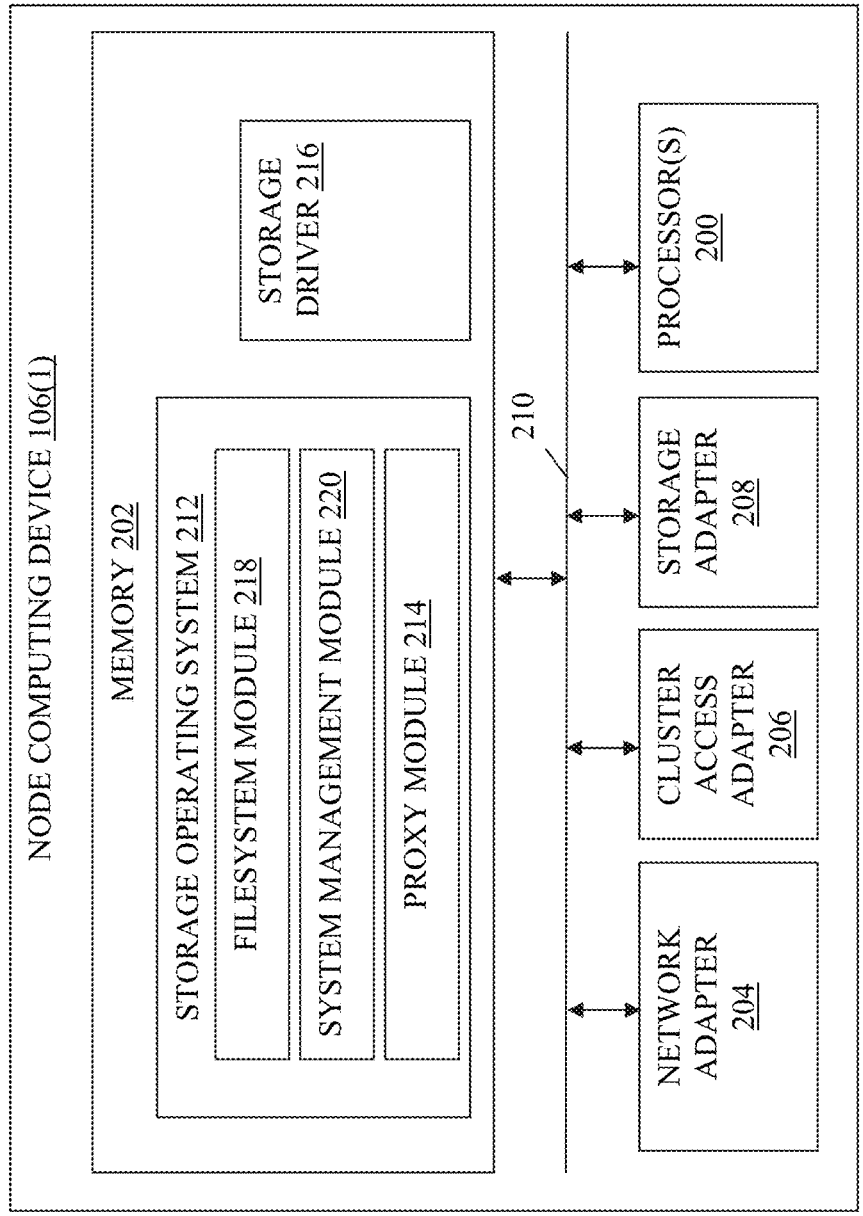
FIG. 2 is a block diagram of an exemplary node computing device.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106(1) also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1). In particular, the node computing device 10(1) may not include proxy module 214.

The network adapter 204 in this example includes the mechanical, electrical and signaling circuitry needed to connect the node computing device 106(1) to one or more of the client devices 122(1)-122(n) over network connections 126(1)-126(n), which may comprise, among other things, a point-to-point connection or a shared medium, such as a local area network. In some examples, the network adapter 204 further communicates (e.g., using TCP/IP) via the cluster fabric 104 and/or another network (e.g. a WAN) (not shown) with cloud storage device(s) 112 to process storage operations associated with data stored thereon.

The storage adapter 208 cooperates with the storage operating system 212 executing on the node computing device 106(1) to access information requested by one of the client devices 122(1)-122(n) (e.g., to access data on a data storage device 124(1)-124(n) managed by a network storage controller). The information may be stored on any type of attached array of writeable media such as magnetic disk drives, flash memory, and/or any other similar media adapted to store information.

In the exemplary data storage devices 124(1)-124(n), information can be stored in data blocks on disks. The storage adapter 208 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 122(1)-122(n) and/or sent to another node computing device attached via the cluster fabric 104. In some examples, a storage driver 216 in the memory 202 interfaces with the storage adapter to facilitate interactions with the data storage devices 124(1)-124(n).

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 124(1)-124(n) or cloud storage device(s) 112 (e.g., or additional clustered devices) in accordance with the client device requests.

The file system module 218 of the storage operating system 212 can establish and manage one or more filesystems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This is often referred to as "mounting" a filesystem.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes the proxy module 214 and a system management module 220. The proxy module 214 manages indirect communications between with the backup service computing device 110 via the primary inbound and outbound queues 116 and 118, respectively, and facilitates implementation of data protection instructions contained therein. The proxy module 214 in some examples identifies peer node computing devices in the same or a different storage cluster to which a message from the backup service computing device 110, and retrieved via the primary inbound queue 116, is directed, and forwards the message accordingly or otherwise carries out instructions relating to data protection workflows that are contained therein.

The system management module 220 of the node computing device 106(1) is configured to interface with the administrator device 107 to facilitate registration of the node computing device 106(1) and, indirectly, node computing device 106(n) in some examples, with the backup service computing device 110. The system management module 220 also provides graphical user interfaces (GUIs), for example, to the administrator device 107, which allow configuration of settings and policies, for example, of the node computing device 106(1).

Accordingly, the administrator device 107 in this particular example allows a user to manually configure and manage devices in the data center 120 and facilitates registration of the node computing devices 106(1)-106(n) with the backup service computing device 110, as described and illustrated in more detail later. The administrator device 107 includes processor(s), a memory, a communication interface, and an input and/or display device interconnected by a system bus. The operations of the proxy module 214 and the system management module 220 of the memory 202 of the node computing device 106(1) are described and illustrated in more detail later with reference to FIG. 4.

Figure 3:
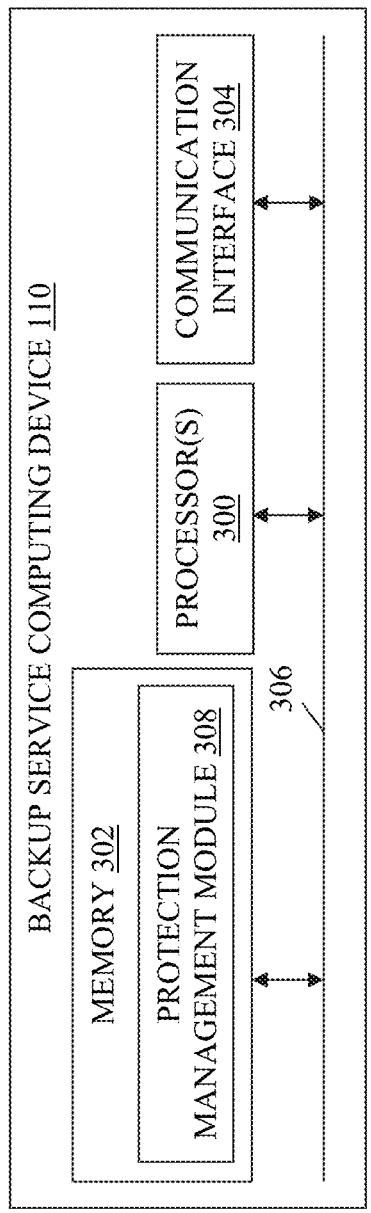
FIG. 3 is a block diagram of an exemplary backup service computing device.

Referring to FIG. 3, a block diagram of the backup service computing device 110 is illustrated. The backup service computing device 110 in this example manages data protection workflows with registered ones of the node computing device 106(1)-106(n), such as ingesting backup copies of data, cataloging the data, versioning, searching, and restore, for example. In this example, the backup service computing device 110 includes processor(s) 300, a memory 302, and a communication interface 304, which are coupled together by a bus 306 or other communication link.

The processor(s) 300 of the backup service computing device 110 may execute a program of stored instructions for one or more aspects of this technology, as described and illustrated by way of the embodiments herein, although the processor(s) 300 could execute other numbers and types of programmed instructions. The processor(s) 300 in the backup service computing device 110 may include one or more central processing units (CPUs) or general purpose processors with one or more processing cores, for example.

The memory 302 of the backup service computing device 110 may include any of various forms of read only memory (ROM), random access memory (RAM), flash memory, non-volatile or volatile memory, or the like, or a combination of such devices, for example. In this example, the memory 302 includes a protection management module 308, although other types and/or numbers of applications or modules can also be included in other examples.

The protection management module 308 communicates with at least the node computing device 106(1) indirectly via the primary inbound and outbound queues 116 and 118, respectively, to implement data protection workflows. To register the node computing device 106(1), the protection management module 308 instantiates the primary inbound and outbound queues 116 and 118, respectively, in response to a request to add a storage cluster from the administrator device 107 in this example. The primary inbound and outbound queues 116 and 118, respectively, can be instantiated on the queue service device 114, for example, although in other examples, the primary inbound and outbound queues 116 and 118, respectively, can be hosted by a same apparatus as the backup service computing device 110, and other arrangements can also be used.

Accordingly, the queue service device 114 includes processor(s), a memory, and a communication interface interconnected by a system bus in this example. The queue service device 114 is configured to generate the primary inbound and outbound queues 116 and 118, respectively, in response to a request received from the backup service computing device 110 over the cloud network 108. In some examples, the queue service device 114 can implement a managed message queuing service, such as Simple Queue Service (SQS) provided by Amazon Web Services, Inc. of Seattle, Wash., although other types of queueing services and queue service devices can also be used in other examples.

Subsequent to instantiating the primary inbound and outbound queues 116 and 118, respectively, the protection management module 308 of the backup service computing device 110 generates a registration key and returns the registration key in response to the request from the administrator. The registration key includes identification information for the primary inbound and outbound queues 116 and 118, respectively and authentication required to access the primary inbound and outbound queues 116 and 118, respectively. The registration key is encrypted. The protection management module 308 then receives a registration request from the node computing device 106(1) and registers the node computing device 106(1) and, optionally, other nodes of a same or different storage cluster in some examples.

Subsequent to registering the node computing device 106(1), the protection management module 308 carries out data protection workflows by generating messages that include instructions and are inserted into the primary inbound queue 116 (which is an outbound queue from the perspective of the backup service computing device 110). The operation of the protection management module 308 is described and illustrated in more detail later with reference to FIG. 5.

The communication interface 304 of the backup service computing device 110 operatively couples and communicates between the cloud storage device(s) 112 and the queue service device 114, which are coupled together by the cloud network 108, such as one or more WANs or public networks, for example, although other types and numbers of communication networks or systems with other types and numbers of connections and configurations to other devices and elements also can be used. By way of example only, the cloud network 108 can use TCP/IP over Ethernet and industry-standard protocols, including HTTP/HTTPS, although other types and numbers of communication networks can be used. The cloud network 108 in this example may employ any suitable interface mechanisms and network communication technologies including Ethernet-based Packet Data Networks (PDNs) and the like.

Although examples of the node computing devices 106(1)-106(n), backup service computing device 110, queue service device 114, cloud storage device(s) 112, administrator device 107, and client devices 122(1)-122(n), are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples of the technology described and illustrated herein may be embodied as one or more non-transitory computer or machine readable media, such as the memory 202 or 302, having machine or processor-executable instructions stored thereon for one or more aspects of the present technology, which when executed by processor(s), such as processor(s) 200 or 300, cause the processor(s) to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 4-5, for example.

Figure 4:
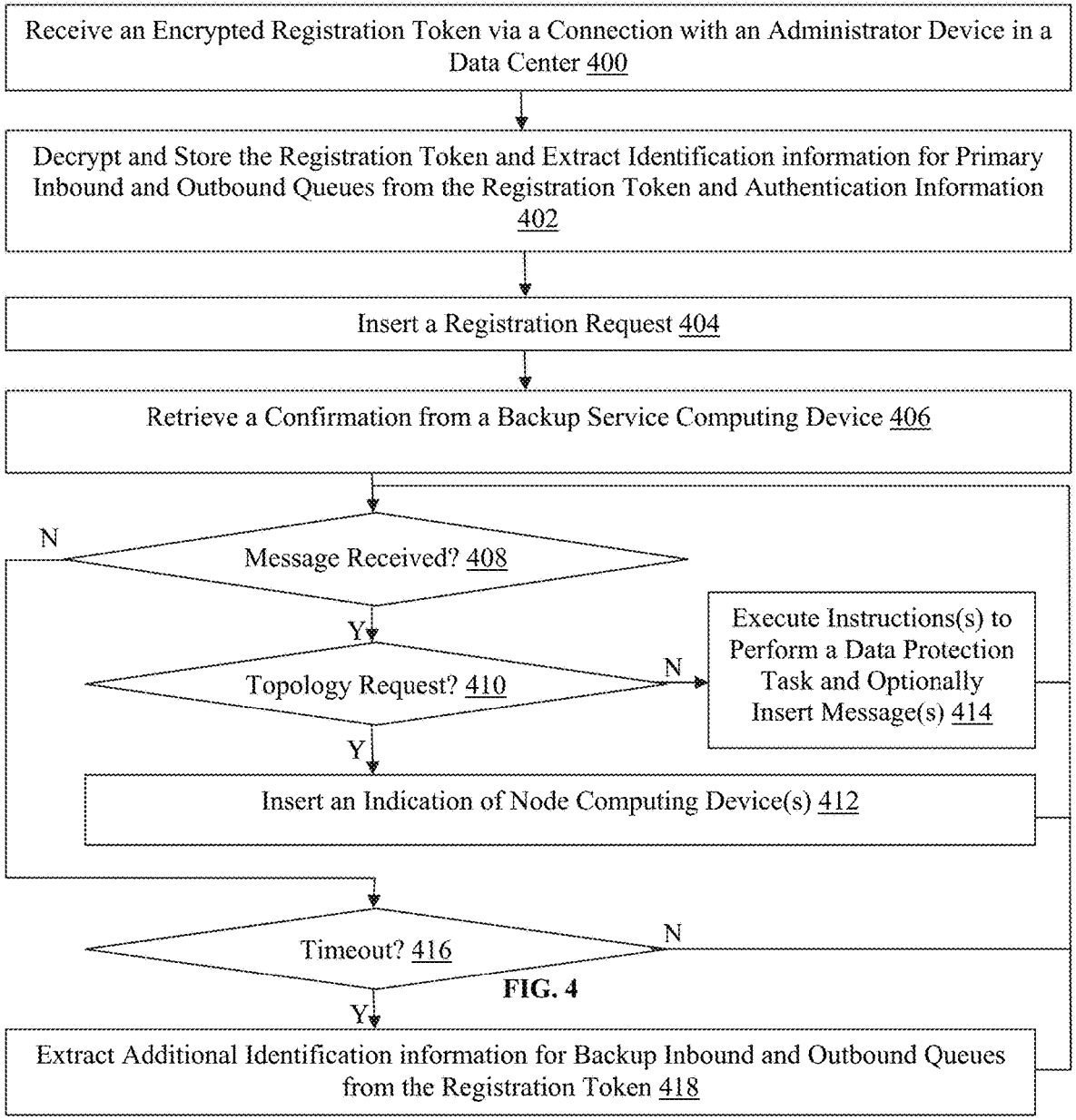
FIG. 4 is a flowchart of an exemplary method for securely facilitating data protection workflows with a node computing device.

Referring to FIG. 4, a flowchart illustrating an exemplary method for securely facilitating data protection workflows with the node computing device 106(1) is illustrated. In step 400 in this example, the node computing device 106(1) receives an encrypted registration token via a connection with the administrator device 107 in the data center 120. A user of the administrator device 107 in this example receives the registration token from the backup service computing device 110 in response to a request to add a storage node or cluster that is sent to the backup service computing device 110 over the data fabric 104 and the cloud network 108 via a first connection.

Following receipt of the registration token, the user of the administrator device 107 requests (e.g., via a separate, second connection) and receives from the system management module 220, for example, a management interface. The management interface allows for the input or submission of the registration token to the node computing device 106(1). Accordingly, the registration token is received by the node computing device 106(1) in step 400 without any direct connection with the backup service computing device 110 or exposure to incoming network traffic from the cloud network 108. Other methods for facilitating receipt by the node computing device 106(1) of the registration token can also be used in other examples.

In step 402, the node computing device 106(1) decrypts and stores the registration token and extracts identification information for the primary inbound and outbound queues 116 and 118, respectively, and authentication information required to access the primary inbound and outbound queues 116 and 118, respectively, from the registration token. The identification information for the primary inbound and outbound queues 116 and 118, respectively, can include a name of the primary inbound and outbound queues 116 and 118, respectively, and address (e.g., uniform resource locator (URL)) or endpoint for the primary inbound and outbound queues 116 and 118, respectively, although other types of identification information for the primary inbound and outbound queues 116 and 118, respectively, can also be included in the identification information.

In some examples, the operating system 212 of node computing device 106(1) is preconfigured with a key that can be used to decrypt the registration token and also is known by the backup service computing device 110, although other methods for encrypting or securing the registration token can also be used. In addition to the identification information for the primary inbound and outbound queues 116 and 118, respectively, the registration token can include an access identifier and/or a registration key, for example, although other information can also be included in the registration token.

In step 404, the node computing device 106(1) inserts a registration request into the primary outbound queue 118 using the identification information for the primary outbound queue 118 that was extracted in step 402. The registration request can optionally be encrypted and/or can include the registration key extracted from the registration token to facilitate verification by the backup service computing device 110.

In step 406, the node computing device 106(1) begins periodically polling the primary inbound queue 116 based on the identification information for the primary inbound queue 116 extracted from the registration token in step 402 and receives a confirmation from the backup service computing device 110. By polling, the node computing device 106(1) prevents receipt of incoming network traffic from the cloud network 108. The confirmation indicates to the node computing device 106(1) that the registration was successful.

In step 408, the node computing device 106(1) continues polling the primary inbound queue 116 and determines whether a message is received. The message can be placed in the primary inbound queue 116 by the backup service computing device 110 as described and illustrated in more detail later. If the node computing device 106(1) determines that a message is received (i.e., has been inserted into the primary inbound queue 116), then the Yes branch is taken to step 410.

In step 410, the node computing device 106(1) optionally determines whether the message is a topology request. The topology request is a request from the backup service computing device 110 for the identification information for storage cluster(s) and constituent node computing devices (e.g., peer storage nodes) that the node computing device 106(1) is aware of. Generally, the topology request will follow a confirmation from the backup service computing device 110, although the topology request can be queued by the backup service node computing device 110 at any time.

If the node computing device 106(1) determines that the message is a topology request, then the Yes branch is taken to step 412.

In step 412, the node computing device 106(1) obtains an indication (e.g., name or address) of node computing devices that it is aware of (e.g., peer node computing device 106(n)) and inserts the indications into the primary outbound queue 118 using the identification information for the primary outbound queue 118 extracted from the registration token in step 402. However, if the node computing device 106(1) determines in step 412 that the received message is not a topology request, then the No branch is taken to step 414.

In step 414, the node computing device 106(1) executes instruction(s) encapsulated in the messages received from the backup service computing device 110 to perform a data protection task. The instruction(s) can relate to the capture by the node computing device 106(1) of snapshots of the volume 132(1) or any other type of configuration or parameter relating to a data protection workflow. Optionally, the node computing device 106(1) also can insert message(s) into the outbound queue 118 that include a confirmation or result of, or response to, the instruction(s).

In iterations in which the topology request has been previously processed, the instruction(s) can be directed to another node computing device (e.g., node computing device 106(n)) based on the indication inserted in step 412. In this way, as described and illustrated in more detail earlier with reference to the proxy module 214, registration of only the node computing device 106(1) is required in order to manage data protection workflows for other node computing device in the same storage cluster or that the node computing device 106(1) is otherwise aware of.

Subsequent to inserting the indication in step 412, or executing the instruction(s) in step 414, the node computing device 106(1) proceeds back to step 408 and continues polling the primary inbound queue 116. In a subsequent iteration, if the node computing device 106(1) determines in step 408 that a message is not received, then the No branch is taken to step 416.

In step 416, the node computing device 106(1) determines whether a timeout has occurred or whether a threshold period of time has elapsed since a last message has been inserted by the backup service computing device 110 into, and retrieved from, the primary inbound queue 116. If the threshold period of time has elapsed, then the backup service computing device 110 may be non-responsive (e.g., due to a failure event).

If the node computing device 106(1) determines that a timeout has not occurred, then the No branch is taken back to step 408 and the node computing device 106(1) continues polling the primary inbound queue 116. Accordingly, the node computing device 106(1) in this example alternatively periodically polls the primary inbound queue 116 and determines whether a timeout has occurred until a message is available for retrieval from the primary inbound queue 116 or a timeout has occurred. However, if the node computing device 106(1) determines in step 416 that a threshold period of time has elapsed since a last message has been retrieved from the primary inbound queue 116, then the Yes branch is taken to step 418.

In step 418, the node computing device 106(1) extracts additional identification information for backup inbound and outbound queues (not shown) from the registration token stored in step 402. In other examples, the identification information for the backup inbound and outbound queues are extracted and stored in step 402 instead of in step 418. The backup inbound and outbound queues effectively replace the primary inbound and outbound queues 116 and 118, respectively, in subsequent iterations of steps 408-412 to provide for automated failover.

In this example, the backup service computing device 110 instantiates the backup inbound and outbound queues on the queue service device 114, for example, contemporaneously with the instantiation of the primary inbound and outbound queues 116 and 118, respectively. The backup inbound and outbound queues are accessible by another backup service computing device (not shown) that is synchronized with the backup service computing device 110 such that it is aware of the state with respect to at least the node computing device 106(1) and can continue managing data protection workflows for at least the node computing device 106(1) without significant interruption following the failure of the backup service computing device 110.

In some examples, the backup service computing devices are server instances hosted by Amazon Web Services, Inc. of Seattle, Wash. The server instances can execute the protection management module 308 or another backup service application, for example. In these examples, the backup service computing device 110 and the synchronized backup server computing device can be in different geographic regions to increase the likelihood of availability of the synchronized backup server computing device in the event of a failure of the backup server computing device 110, although other types of backup server computing devices and other methods for providing high availability for backup services can also be used in other examples.

Subsequent to extracting the additional identification information for the backup inbound and outbound queues in step 418, and replacing the stored identification information for the primary inbound and outbound queues 116 and 118, respectively, the node computing device 106(1) proceeds back to step 408 and begins periodic polling of the backup inbound queue. In other examples, one or more of steps 400-418 can be performed in parallel for any number of node computing devices and/or in a different order.

Figure 5:
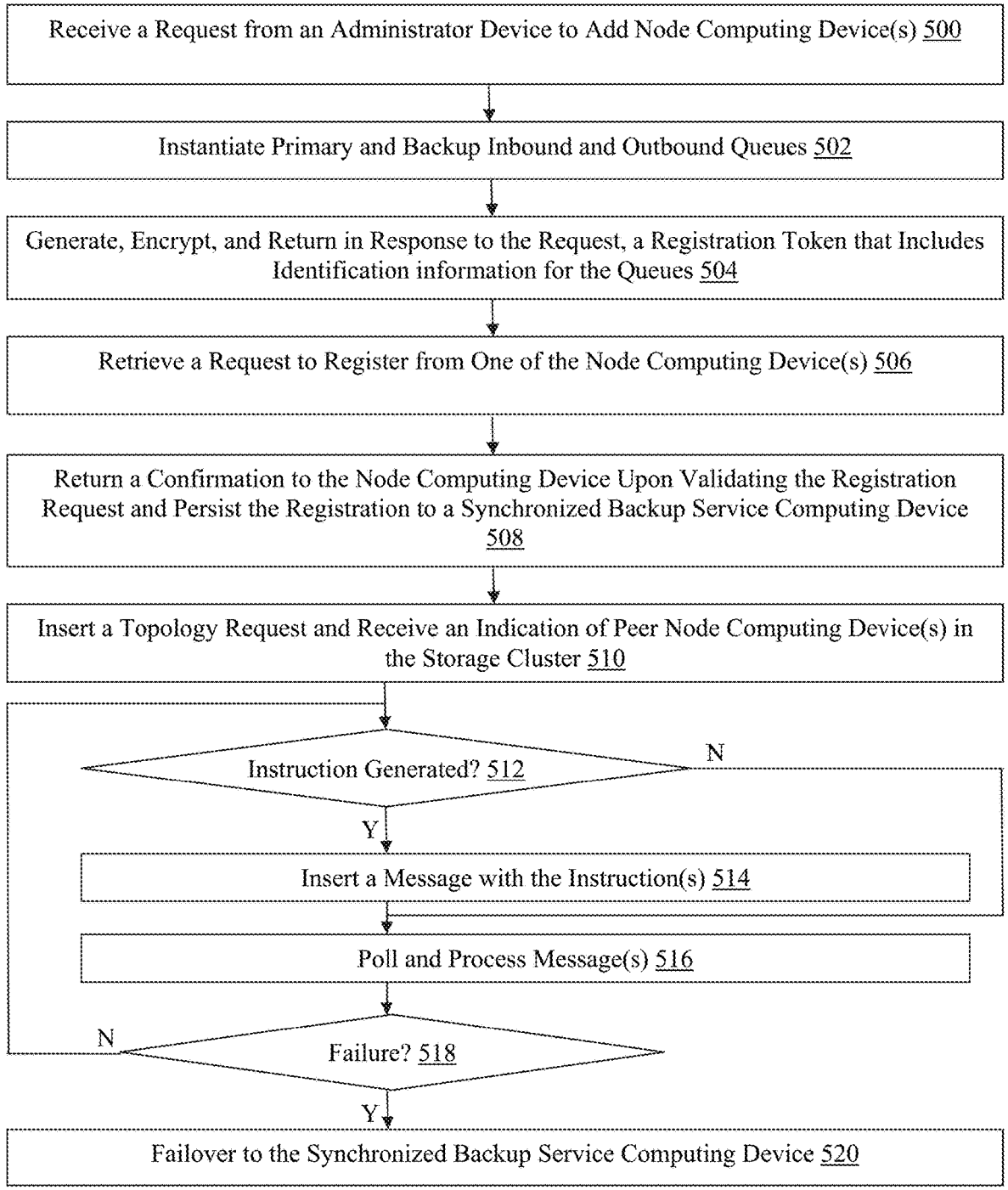
FIG. 5 is a flow diagram of an exemplary method for securely facilitating data protection workflows with a backup service computing device.

Referring to FIG. 5, a flowchart of an exemplary method for securely facilitating data protection workflows with the backup service computing device 110 is illustrated. In step 500 in this example, the backup service computing device 110 receives a request from the administrator device 107 to add storage nodes, such as a storage cluster that includes node computing device 106(1)-106(n). The backup server computing device 110 can provide an interface to the administrator device 107 upon request that facilities input of the request to add the storage cluster, for example.

In step 502, the backup service computing device 110 instantiates the primary inbound and outbound queues 116 and 118, respectively, via communication over the cloud network 108 with the queue service device 114, for example. Optionally, in examples in which high availability of the backup service is provided, the backup service computing device 110 can also instantiate backup inbound and outbound queues to be used by another backup service computing device that will be synchronized with respect to the state of the node computing device 106(1)-106(n), for example.

In step 504, the backup service computing device 110 generates, encrypts, and returns to the administrator device 107 in response to the request received in step 500, a registration token that includes identification information for the primary inbound and outbound queues, 116 and 118, respectively, as well as the backup inbound and outbound queues. The identification information can include names and/or network addresses, for example, and the registration token can also include an access identifier and/or a registration key, and other information can also be included in the registration token in other examples. The registration token can be encrypted using a secret key that is known by the node computing device 106(1) (e.g., installed by a manufacturer or otherwise stored prior to registration).

In step 506, the backup service computing device 110 begins polling the primary outbound queue 118 based on the identification information and retrieves a request to register from the node computing device 106(1). The primary inbound and outbound queues 116 and 118, respectively, are named herein from the perspective of the node computing device 106(1), but serve the opposite function from the perspective of the backup service computing device 110. The registration request could have been inserted into the primary outbound queue 118 by the node computing device 106(1) as described and illustrated in more detail earlier with reference to step 404 of FIG. 4, for example.

In step 508, the backup service computing device 110 returns a confirmation to the node computing device upon validating the registration request and persisting the registration to the synchronized backup service computing device. To return the confirmation, the backup service computing device 110 inserts a confirmation message into the primary inbound queue 116 in this example.

In some examples, the registration request can be validated based on inclusion of the registration key that was included in the registration token, although other methods for validating the registration request can also be used. To persist the registration, the backup service computing device 110 can send the identification information for the backup inbound and outbound queues to the synchronized backup service computing device, along with any other contextual information regarding the node computing device 106(1), for example.

In step 510, the backup service computing device 110 optionally sends a topology request to the node computing device 106(1) by inserting a message including the topology request into the primary inbound queue 116. The topology request is a request to obtain information regarding other node computing device coupled to the node computing device 106(1), such as peer storage nodes or other node computing devices in a storage cluster with the node computing device 106(1).

Accordingly, the backup service computing device 110 polls the primary outbound queue 118 in step 510, subsequent to inserting the topology request into the primary inbound queue 116, to obtain and store an indication of other node computing devices from the node computing device 106(1). With the indication of the other node computing devices, the backup service computing device 110 can communicate instructions relating to data protection workflows to the other node computing devices via the primary inbound queue 116 and the proxy module 214 of the node computing device 106(1).

In step 512, the backup service computing device 110 determines whether any instruction(s) have been generated, such as by the protection management module 308 and relating to a data protection workflow. If the backup service computing device 110 determines that an instruction has been generated, then the Yes branch is taken to step 514.

In step 514, the backup service computing device 110 inserts a message that includes the generated instruction(s) into the primary inbound queue 116. The node computing device 106(1) can subsequently retrieve the message and execute the instruction(s) as described and illustrated in more detail earlier with reference to steps 408 and 414 of FIG. 4, for example.

Accordingly, the node computing device 106(1) and backup service computing device 110 communicate indirectly via the primary inbound and outbound queues 116 and 118, respectively, to manage and implement data protection workflows across a storage cluster that includes the node computing device 106(1) in this example. Subsequent to inserting the message in step 514, or if the backup service computing device 110 determines in step 512 that an instruction has not been generated and the No branch is taken, then the backup service computing device 110 proceeds to step 516.

In step 516, the backup service computing device 110 polls the primary outbound queue 118 and processes any message(s) retrieved from the primary outbound queue 118 that were inserted by the node computing device 106(1). The message can include confirmation or instructions, user data, metadata, snapshots, or any other information associated with a data protection workflow, for example.

In step 518, the backup service computing device 110 determines whether there is a failure that requires failover to the synchronized backup service computing device. Optionally, the backup service computing device 110 can communicate information regarding the data protection workflows and the state of the node computing device 106(1) and/or associated storage cluster(s) to the synchronized backup service computing device in parallel with one or more of steps 506-516.

If the backup service computing device 110 determines that a failure has not occurred, then the No branch is taken back to step 512 and the backup service computing device 110 continues to wait for an instruction to be generated or a message to be retrieved from the primary outbound queue 118 as a result of polling the primary outbound queue 118. However, if the backup service computing device 110 determines that a failure has occurred, then the Yes branch is taken to step 520.

In step 520, the backup service computing device 110 initiates a failover to the synchronized backup service computing device. The failover can be initiated based on a message to the synchronized backup service computing device prior to the failure that requests the takeover. In other examples, the communication is not explicit but is implicit or automated in the event of a determined failure of the backup service computing device 110. Other methods for implementing the failover and/or providing high availability of the backup service can also be used in other examples.

As a result of the failover, the synchronized backup service computing device will subsequently use the backup inbound and outbound queues to communicate with the node computing device 106(1) and perform steps 512-516, for example. In other examples, one or more of steps 500-520 can be performed in a different order and/or in parallel for any number of node computing devices.

With this technology, storage nodes can communicate with backup services in the cloud without exposing any ports (e.g., HTTP ports) to traffic originating from the cloud network, thereby facilitating increased security. The storage nodes utilizing polling from queues that allowed a firewall in a data center to block incoming network traffic from the cloud network. Additionally, backup services can carry out data protection workflows with many storage nodes (e.g., peer storage nodes or cluster(s) of storage nodes) via a cloud proxy implemented by one of the storage nodes, which eliminates the need for every storage node to register with the backup service.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   receiving, by a node computing device in a data center, a registration token from an administrator device, wherein the registration token originated from a backup service computing device that is external to the data center;
   extracting, by the node computing device, a registration key and identification information for a primary inbound queue and a primary outbound queue from the registration token, wherein the identification information comprises a network address for each of the primary inbound and outbound queues;
   inserting, by the node computing device, a registration request into the primary outbound queue using the identification information and one or more communication networks that are external to the data center, wherein the registration request comprises the registration key to facilitate verification of the node computing device by the backup service computing device;
   polling, by the node computing device, the primary inbound queue using the identification information and the communication networks to retrieve one or more messages from the backup service computing device that instantiated the primary inbound and outbound queues; and
   executing, by the node computing device, one or more instructions determined from one or more of the messages in order to perform a data protection task.

2. The method of claim 1, wherein one of the messages comprises a topology request and the method further comprises inserting, by the node computing device, an indication of one or more peer node computing devices in a same storage cluster as the node computing device into the primary outbound queue using the identification information and the communication networks.

3. The method of claim 2, further comprising communicating, by the node computing device, with one of the peer node computing devices, when one of the messages is directed to the one of the peer node computing devices.

4. The method of claim 1, wherein the polling is periodic and the method further comprising extracting, by the node computing device, additional identification information for a backup inbound queue and a backup outbound queue from the registration token when a threshold time period has elapsed without retrieval of a message from the primary inbound queue.

5. The method of claim 1, wherein one or more of the messages comprise instructions for one or more data protection tasks associated with backup versions of data maintained on one or more cloud storage devices managed by the backup service computing device via one or more of the communication networks.

6. The method of claim 1, wherein the method further comprises communicating, by the node computing device, indirectly with the backup service computing device via the primary inbound and outbound queues using HyperText Transfer Protocol (HTTP) and without exposing an HTTP port of the node computing device to the backup service computing device.

7. A non-transitory machine readable medium having stored thereon instructions for securely facilitating data protection workflows, the instructions comprising machine executable code that, when executed by at least one machine in a data center, causes the machine to:
   receive a registration token from an administrator device, wherein the registration token originated from a backup service computing device that is external to the data center;
   extract a registration key and identification information for a primary inbound queue and a primary outbound queue from the registration token, wherein the identification information comprises a network address for each of the primary inbound and outbound queues;
   insert a registration request into the primary outbound queue using the identification information and one or more communication networks that are external to the data center, wherein the registration request comprises the registration key to facilitate verification of the machine by the backup service computing device;
   poll the primary inbound queue using the identification information and the communication networks to retrieve one or more messages from the backup service computing device that instantiated the primary inbound and outbound queues; and
   execute one or more instructions determined from one or more of the messages in order to perform a data protection task.

8. The non-transitory machine readable medium of claim 7, wherein one of the messages comprises a topology request and the machine executable code, when executed by the machine, further causes the machine to insert an indication of one or more peer machines in a same storage cluster as the machine into the primary outbound queue using the identification information and the communication networks.

9. The non-transitory machine readable medium of claim 8, wherein the machine executable code, when executed by the machine, further causes the machine to communicate with one of the peer machines, when one of the messages is directed to the one of the machines.

10. The non-transitory machine readable medium of claim 7, wherein the polling is periodic and the machine executable code, when executed by the machine, further causes the machine to extract additional identification information for a backup inbound queue and a backup outbound queue from the registration token when a threshold time period has elapsed without retrieval of a message from the primary inbound queue.

11. The non-transitory machine readable medium of claim 7, wherein one or more of the messages comprise instructions for one or more data protection tasks associated with backup versions of data maintained on one or more cloud storage devices managed by the backup service computing device via one or more of the communication networks.

12. The non-transitory machine readable medium of claim 7, wherein the machine executable code, when executed by the machine, further causes the machine to communicate indirectly with the backup service computing device via the primary inbound and outbound queues using HyperText Transfer Protocol (HTTP) and without exposing an HTTP port of the machine to the backup service computing device.

13. A node computing device in a data center, the node computing device comprising:
   a memory containing machine readable medium comprising machine executable code having stored thereon instructions for securely facilitating data protection workflows; and
   a processor coupled to the memory, the processor configured to execute the machine executable code to cause the processor to:
      receive a registration token from an administrator device, wherein the registration token originated from a backup service computing device that is external to the data center;
      extract a registration key and identification information for a primary inbound queue and a primary outbound queue from the registration token, wherein the identification information comprises a network address for each of the primary inbound and outbound queues;
      insert a registration request into the primary outbound queue using the identification information and one or more communication networks that are external to the data center, wherein the registration request comprises the registration key to facilitate verification of the node computing device by the backup service computing device;
      poll the primary inbound queue using the identification information and the communication networks to retrieve one or more messages from the backup service computing device that instantiated the primary inbound and outbound queues; and
      execute one or more instructions determined from one or more of the messages in order to perform a data protection task.

14. The node computing device of claim 13, wherein one of the messages comprises a topology request and the processor is further configured to execute the machine executable code to further cause the processor to insert an indication of one or more peer node computing devices in a same storage cluster as the node computing device into the primary outbound queue using the identification information and the communication networks.

15. The node computing device of claim 14, wherein the processor is further configured to execute the machine executable code to further cause the processor to communicate with one of the peer node computing devices, when one of the messages is directed to the one of the peer node computing devices.

16. The node computing device of claim 13, wherein the polling is periodic and the processor is further configured to execute the machine executable code to further cause the processor to extract additional identification information for a backup inbound queue and a backup outbound queue from the registration token when a threshold time period has elapsed without retrieval of a message from the primary inbound queue.

17. The node computing device of claim 13, wherein one or more of the messages comprise instructions for one or more data protection tasks associated with backup versions of data maintained on one or more cloud storage devices managed by the backup service computing device via one or more of the communication networks.

18. The node computing device of claim 13, wherein the processor is further configured to execute the machine executable code to further cause the processor to communicate indirectly with the backup service computing device via the primary inbound and outbound queues using HyperText Transfer Protocol (HTTP) and without exposing an HTTP port of the node computing device to the backup service computing device.

19. The node computing device of claim 13, wherein the primary inbound and outbound queues are hosted by a queue service device that is external to the data center and separate from the backup service computing device.

20. The node computing device of claim 13, wherein the processor is further configured to execute the machine executable code to further cause the processor to decrypt the registration token, and the messages retrieved from the backup service computing device as a result of the polling of the primary inbound queue, using a stored key that is shared with the backup service computing device.

* * * * *